United States Patent
Raisch et al.

(10) Patent No.: US 6,213,536 B1
(45) Date of Patent: Apr. 10, 2001

(54) SEALING DEVICE FOR AT LEAST ONE FRAMELESS WINDOW OF A MOTOR VEHICLE

(75) Inventors: Dieter Raisch, Rutesheim; Friedrich Depfenhart, Heimsheim; Dirk Arnold, Freudenstadt; Wilfried Kalb, Leonberg, all of (DE)

(73) Assignee: Dr. Ing. h.c.F. Porsche AG, Weissach (DE)

( * ) Notice: Subject to any disclaimer, the term of this patent is extended or adjusted under 35 U.S.C. 154(b) by 0 days.

(21) Appl. No.: 09/233,032

(22) Filed: Jan. 20, 1999

(30) Foreign Application Priority Data

Jan. 20, 1998 (DE) .............................................. 198 01 870

(51) Int. Cl.⁷ ...................................................... B60J 10/08
(52) U.S. Cl. .................................. 296/146.9; 296/146.14; 296/107.04; 49/475.1
(58) Field of Search .............................. 296/146.9, 206, 296/107.04, 135, 107.05, 146.14; 49/475.1, 484.1, 489.1

(56) References Cited

U.S. PATENT DOCUMENTS

| | | | |
|---|---|---|---|
| 4,047,751 | * 9/1977 | Koike | 296/146.9 |
| 5,086,588 | * 2/1992 | Nakano et al. | 49/475.1 X |
| 5,307,591 | * 5/1994 | Usuta et al. | 296/475.1 X |
| 5,356,194 | * 10/1994 | Takeuchi et al. | 296/146.9 |
| 6,030,022 | * 2/2000 | Bormann et al. | 296/107.04 |

FOREIGN PATENT DOCUMENTS

| | | |
|---|---|---|
| 295 09 880 U | 11/1995 | (DE) . |
| 195 31 600 | 3/1997 | (DE) . |
| 196 22 953 | 8/1997 | (DE) . |
| 0 258 599 | 3/1988 | (EP) . |
| 0 524 447 | 1/1993 | (EP) . |
| 0 618 101 | 10/1994 | (EP) . |
| 2 580 999 | 10/1986 | (FR) . |

\* cited by examiner

Primary Examiner—D. Glenn Dayoan
Assistant Examiner—Jason Morrow
(74) Attorney, Agent, or Firm—Evenson, McKeown, Edwards & Lenahan, P.L.L.C.

(57) ABSTRACT

A sealing device for at least one frameless window of a motor vehicle includes at least one sealing body with at least one embedded supporting rail, with elastomer profile strands being provided that are formed by areawise sheathing of the supporting rails and which cooperate with the inside and the outside of the window. To improve the sealing action of the sealing device and to make manufacture less expensive, provision is made such that the elastomer profile strands of each sealing body that cooperate with the inside of the window and with the outside of the window have separate supporting rails associated with them, in that both supporting rails are connected with one another at legs that are directed in the same direction and are mounted one on top of the other, and in that the areas of the elastomer profile strands that are in an operating relationship with the window overlap one another areawise in the transverse direction of the vehicle when the sealing bodies are mounted.

21 Claims, 11 Drawing Sheets

SEALING DEVICE FOR AT LEAST ONE FRAMELESS WINDOW OF A MOTOR VEHICLE

BACKGROUND AND SUMMARY OF THE INVENTION

This application claims the priority of German Application No. 198 01 870.3, filed Jan. 20, 1998, the disclosure of which is expressly incorporated by reference herein.

The invention relates to a sealing device for at least one frameless window of a motor vehicle and, more particularly, to a sealing device having at least one sealing body with at least one embedded supporting rail.

German Patent document DE 295 09 880 U1 teaches a sealing body forming a sealing device for a frameless window of a convertible. The sealing body has a shaped supporting rail, on which two elastomer profile strands are formed. The stands are produced by sectionwise sheathing. The outer elastomer profile strand cooperates with the outside of the window when the window and top are in the closed position and the inner elastomer profile strand cooperates with the inside of the window. Since the lip sections cooperating with the window are produced in a single workstep (operation), the two lip sections cannot overlap in the transverse direction of the vehicle. As a result, this sealing device has only a limited sealing effect in the closed position.

The goal of the present invention is to take precautionary measures in a sealing device such that the sealing effect of the sealing device is further improved and the cost of manufacture is reduced.

According to the invention, this goal is achieved by a sealing device for at least one frameless window of a motor vehicle, the sealing device having at least one sealing body with at least one embedded supporting rail. Elastomer profile strands that are formed by areawise sheathing of the at least one supporting rail are provided. The strands cooperate with the inside and outside of the window. A separate supporting rail is associated with the elastomer profile strand of each sealing body that cooperates with the outside of a window. Both supporting rails are connected with one another at legs that are directed in the same direction and are located one above the other. When the sealing bodies are installed, the areas of the elastomer profile strands that are in an operating relationship with the windows overlap areawise in the transverse direction of the vehicle. Additional features that define the invention in an advantageous manner are described herein.

The primary advantages achieved with the invention include the fact that by providing two supporting rails sheathed sectionwise, more extensive profile cross sections as well as an overlapping of the sealing surfaces are made possible so that an improved sealing effect can be achieved. A sealing body of this kind is also easier to manufacture and install. The two supporting rails can be adjusted with respect to one another and thus can accept relatively large tolerances. The supporting rails can be connected by riveting, screwing, gluing, welding, or the like. Providing a plurality of openings in the sheathed legs of the supporting rails produces an intimate solid connection between the supporting rails and the elastomer profile strand. By providing areawise reinforcement of the sealing bodies at their ends by forming closed hollow body areas, further optimization of the sealing effect is achieved.

Other objects, advantages and novel features of the present invention will become apparent from the following detailed description of the invention when considered in conjunction with the accompanying drawings.

DETAILED DESCRIPTION OF THE DRAWINGS

Figure 1:
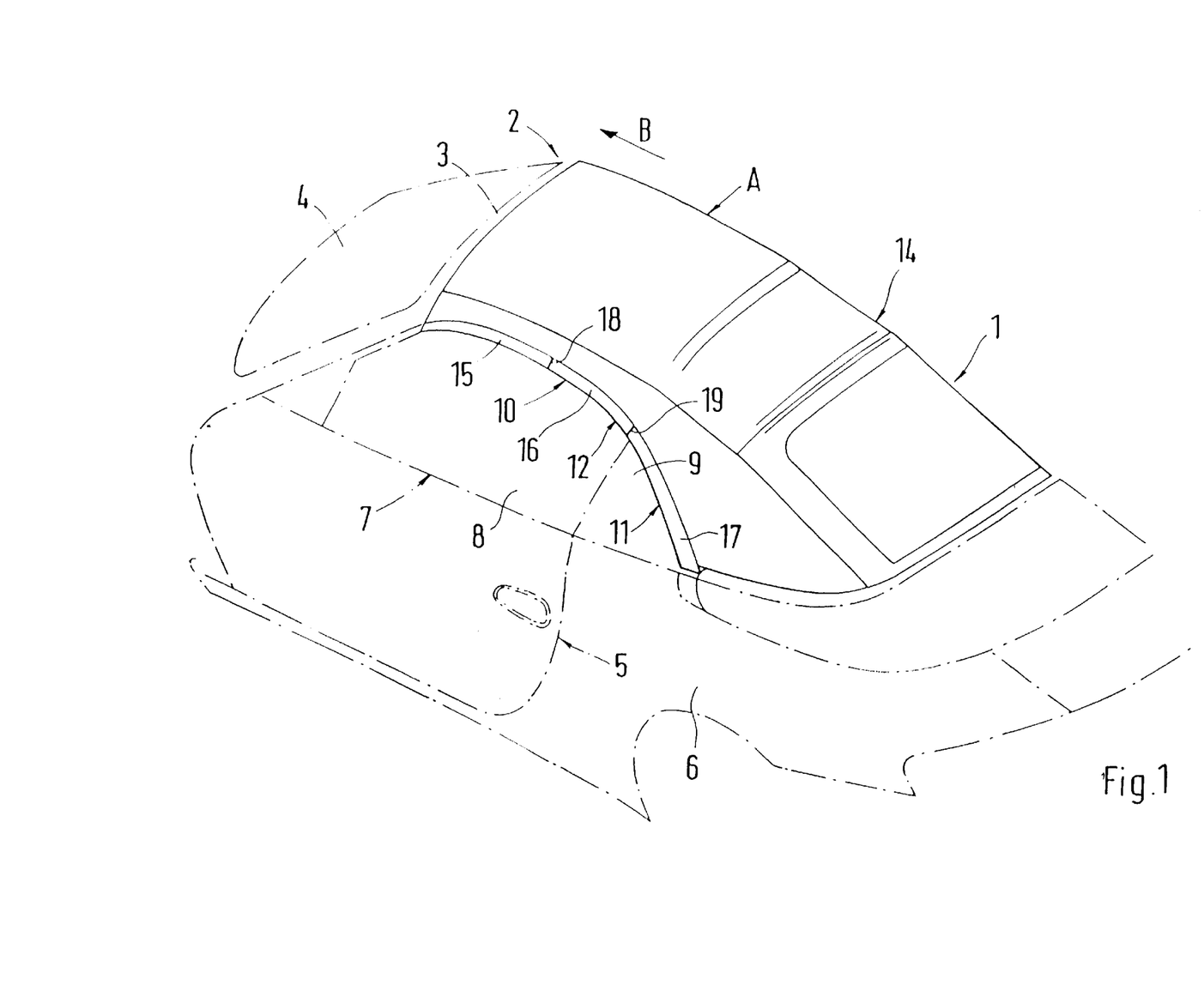
FIG. 1 is a perspective partial view taken diagonally from the rear of one half of a motor vehicle.

FIG. 1 shows a partial area of a motor vehicle 1 whose body 2 in the area shown includes a windshield 4 mounted in a windshield frame 3, side doors 5, and rear side parts 6. Windows 8, 9 placed against one another extend above a belt line 7 of the vehicle, as viewed in the lengthwise direction of the vehicle, with window 8 being formed by a door window pane adjustable heightwise and window 9 being formed by a lowerable and/or pivotable rear window pane. Both windows 8, 9 are made frameless, at least along their upper boundary edges 10, 11.

On each lengthwise side of the vehicle, a lateral roof frame 12 runs adjacent to the two boundary edges 10 and 11 of windows 8 and 9, respectively, on which frame a sealing device 13 is provided that cooperates with the upper boundary areas of windows 8 and 9 when windows 8 and 9 are raised into a closed position.

Lateral roof frame 12 can be associated with a fixed body, a hard top, or a soft top, and can be made in one or more pieces.

Figure 3:
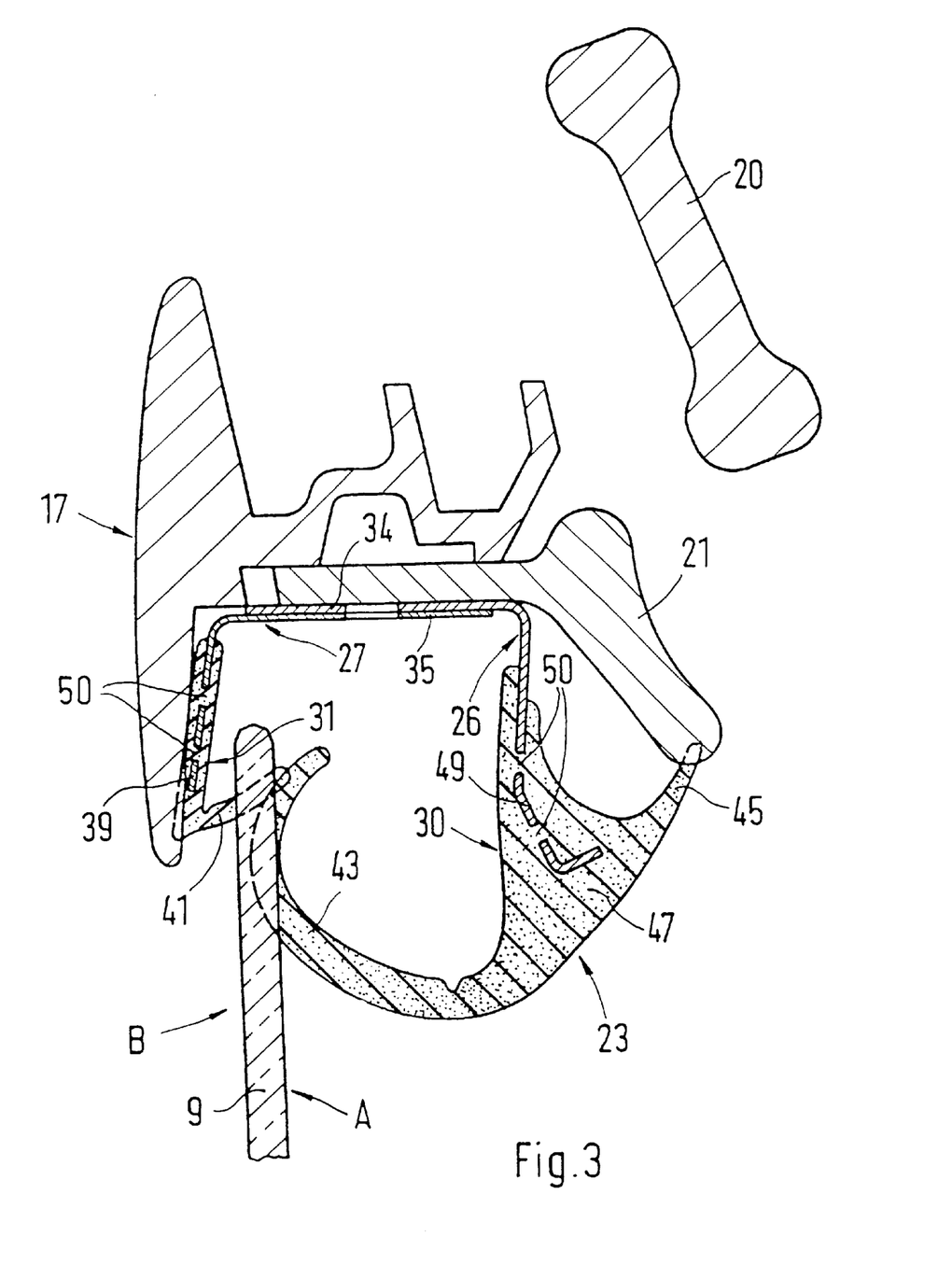
FIG. 3 is a section along line III—III in FIG. 2 in an enlarged view.
Figure 6:
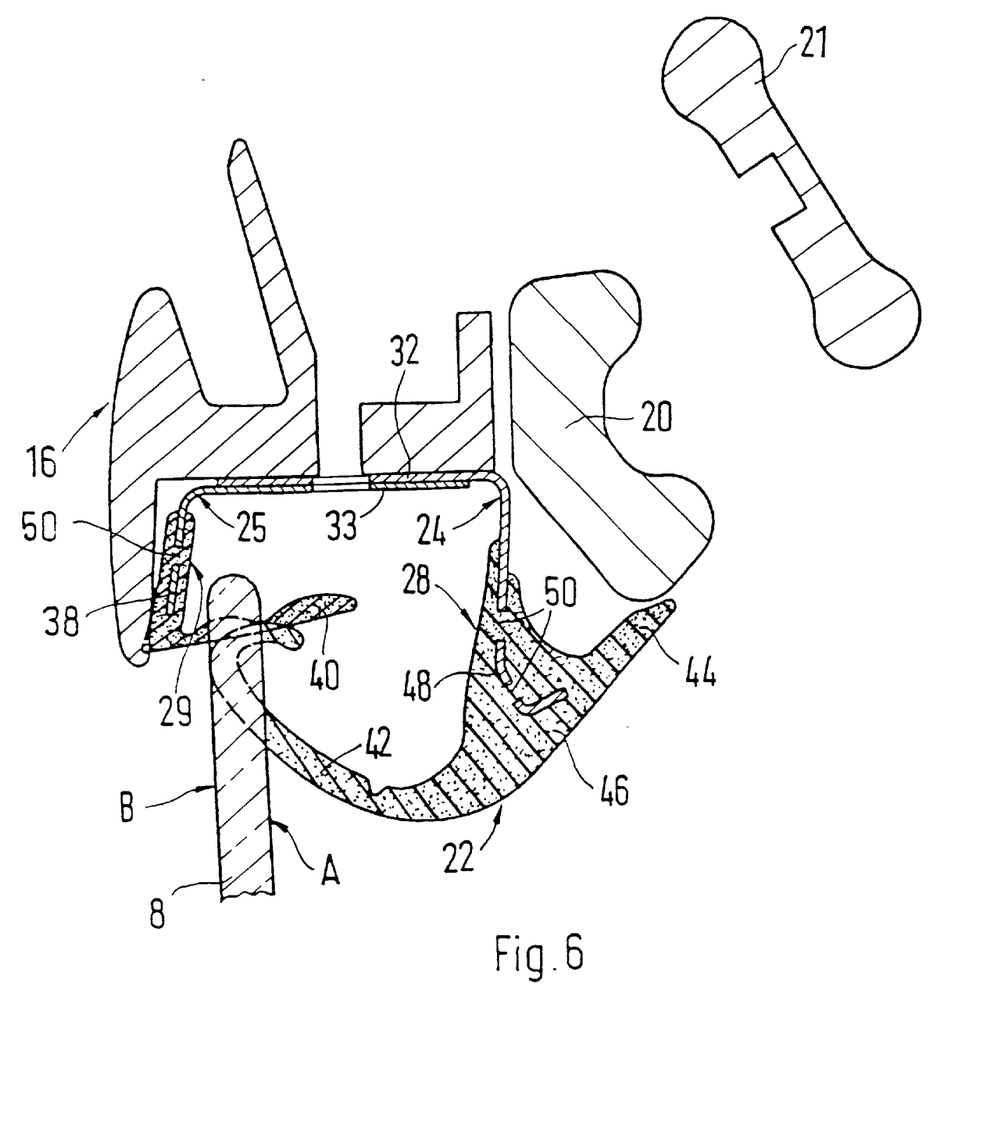
FIG. 6 is a section along line VI—VI in FIG. 2 in an enlarged view.
Figure 7:
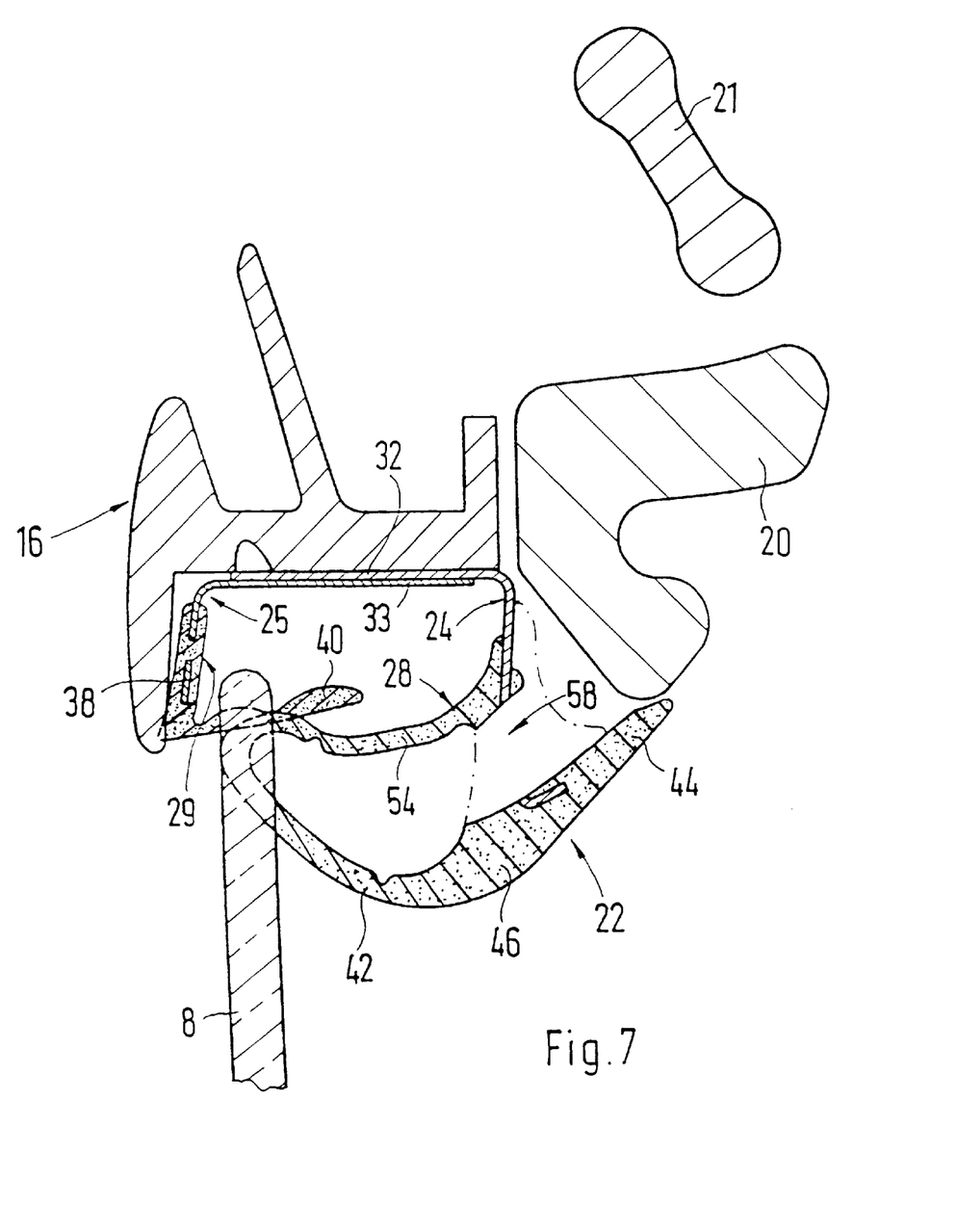
FIG. 7 is a section along line VII—VII in FIG. 2 in an enlarged view.

In the embodiment, a folding soft top 14 is provided above the belt line 7. The top 14 is composed of a top frame pivotably mounted on the body 2 and a top fabric supported by the frame. Lateral roof frame 12 is made of multiple parts in the embodiment shown, with roof frame sections 15, 16, 17 having their contours flush against one another in the closed position A of folding top 14, forming narrow cracks 18, 19. Front roof frame section 15 is made integral with a dimensionally stable front top section of the top frame, not shown in greater detail, while middle roof frame section 16 and rear roof frame section 17 are supported by arms 20, 21 of the top frame (see FIGS. 3 and 6). Top frame section 16 is adjustably attached to arm 20 and roof frame section 17 is adjustably attached to arm 21.

Figure 2:
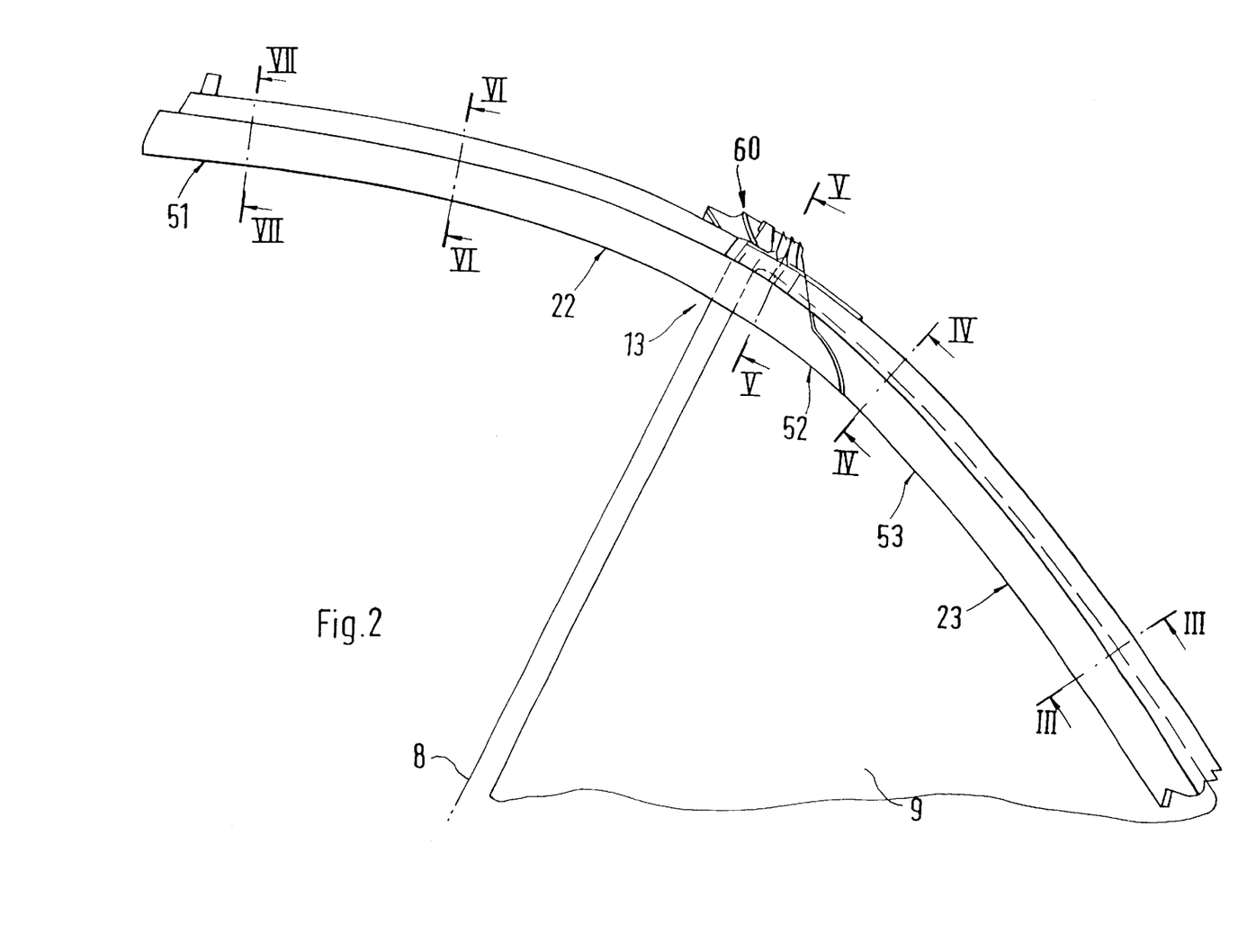
FIG. 2 is a partial side view of the two adjoining lateral windows and the sealing device.
Figure 8:
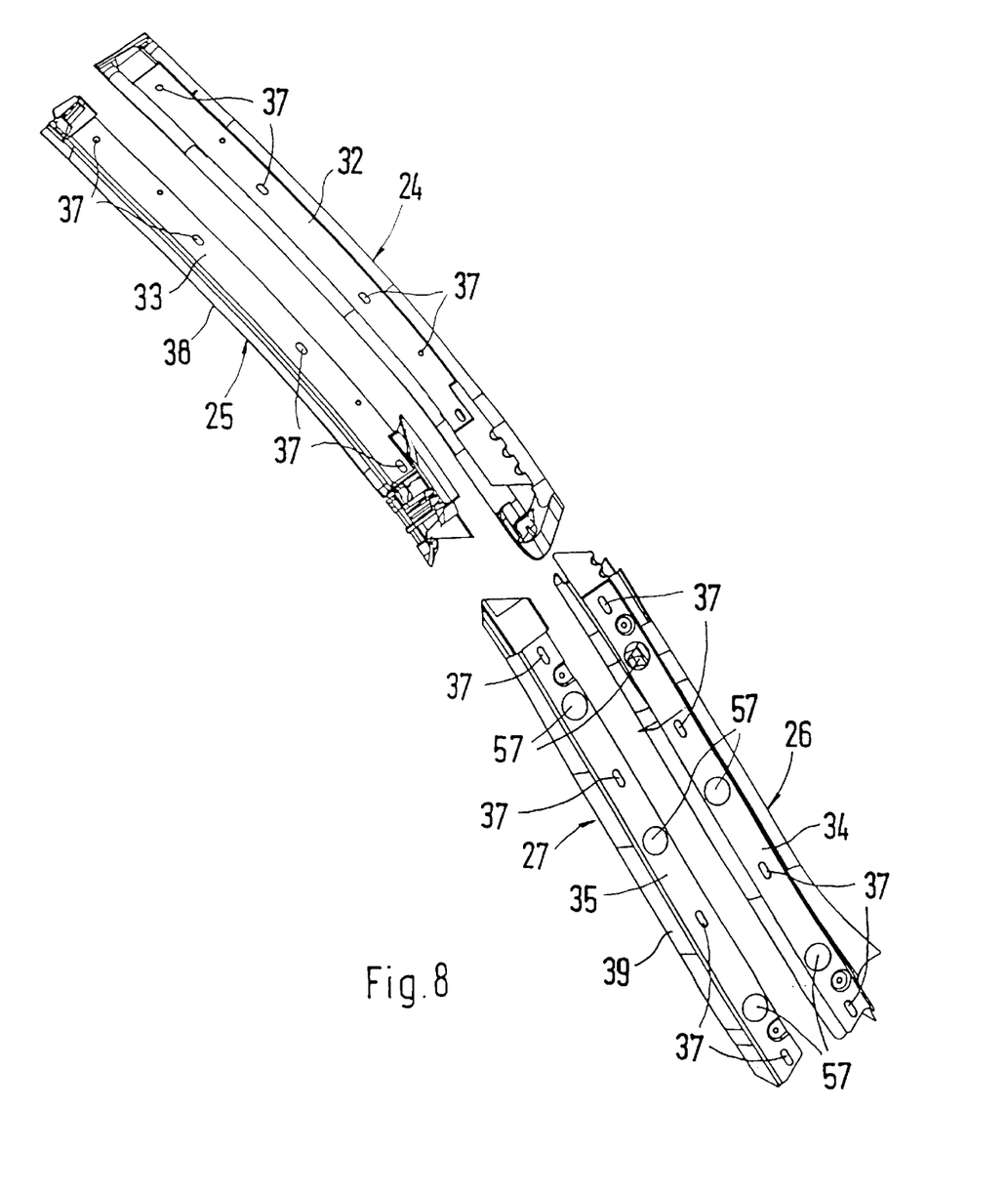
FIG. 8 shows the supporting rails of both sealing bodies in a perspective view.
Figure 9:
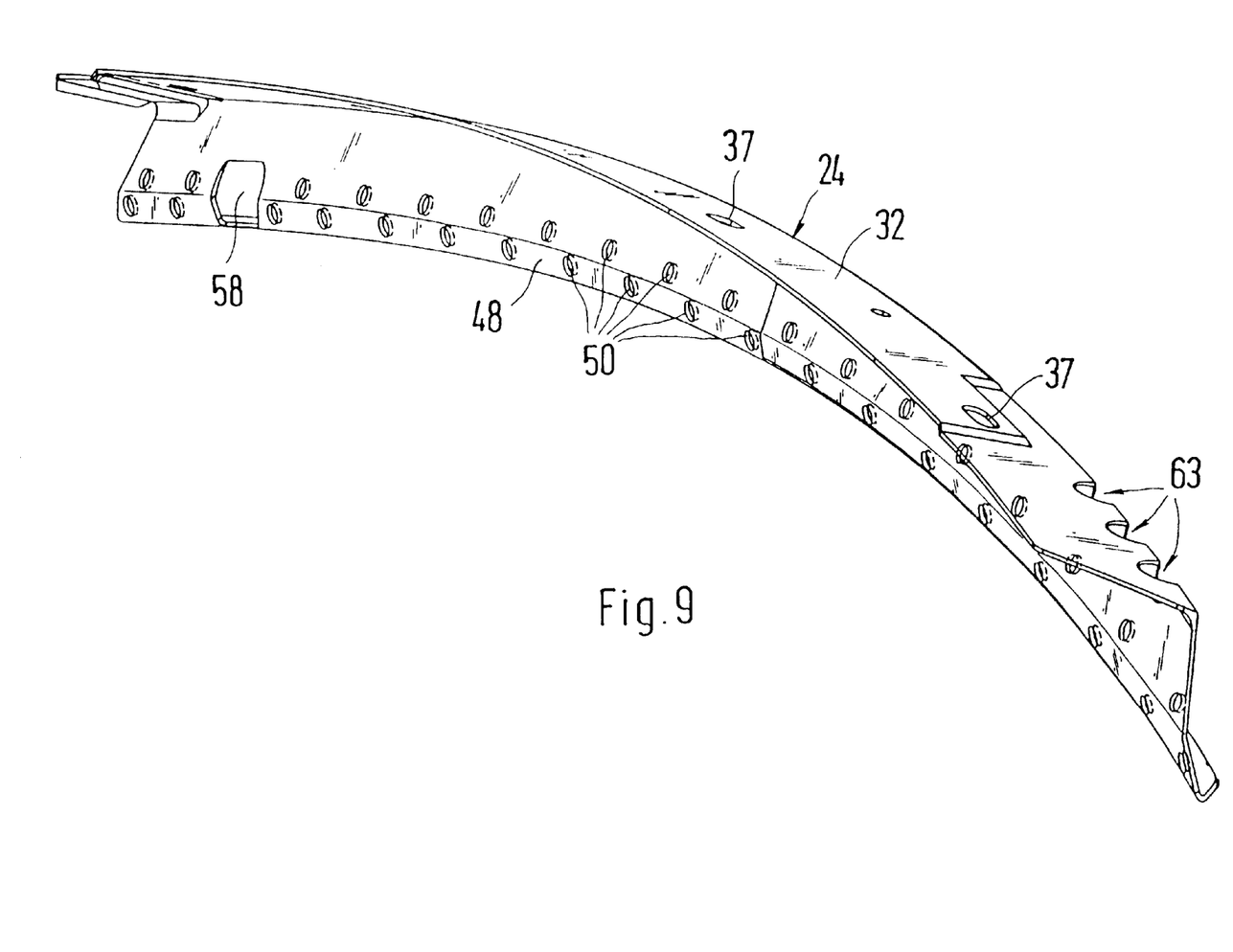
FIG. 9 shows the internal supporting rail of the front sealing body in a perspective view.

In the embodiment, sealing device 13 (FIG. 2) comprises three sealing bodies that abut one another when folding top 14 is in the closed position. At least sealing bodies 22, 23 releasably attached to roof frame sections 16 and 17 each comprise shaped supporting rails 24, 25 and 26, 27 (FIG. 8). An elastomer profile strand 28, 29, 30, 31 is formed on each supporting rail 24, 25 and 26, 27 by sectionwise sheathing. Supporting rails 24, 25 are associated with sealing body 22 located in front and supporting rails 26, 27 are associated with sealing body 23 located further to the rear. Both supporting rails 24, 25 and 26, 27 of each sealing body 22, 23 are connected locally with one another at legs 32, 33 and 34, 35 directed in the same direction. This can be accomplished by riveting, screwing, gluing, welding, or the like.

Figure 4:
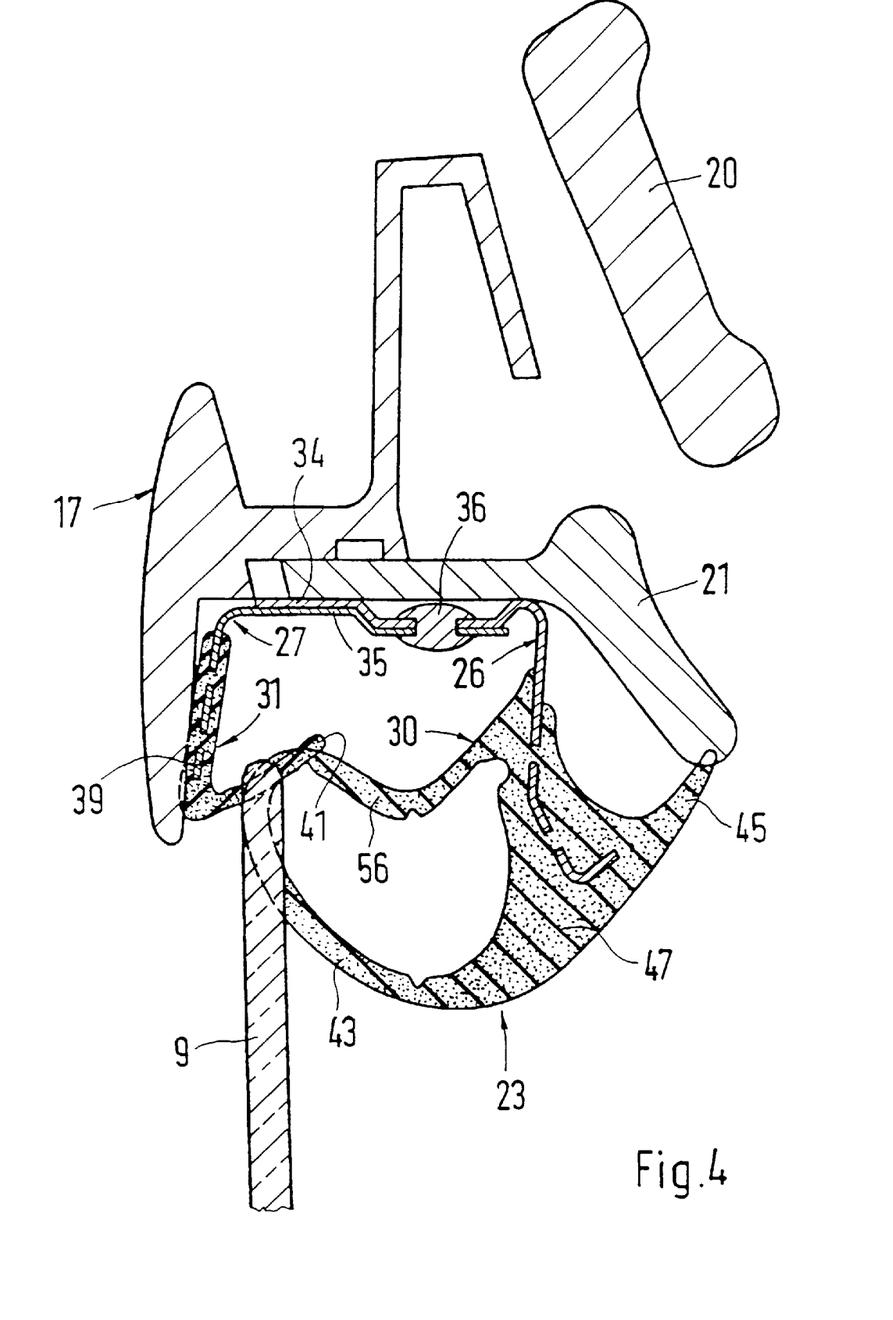
FIG. 4 is a section along line IV—IV in FIG. 2 in an enlarged view.
Figure 5:
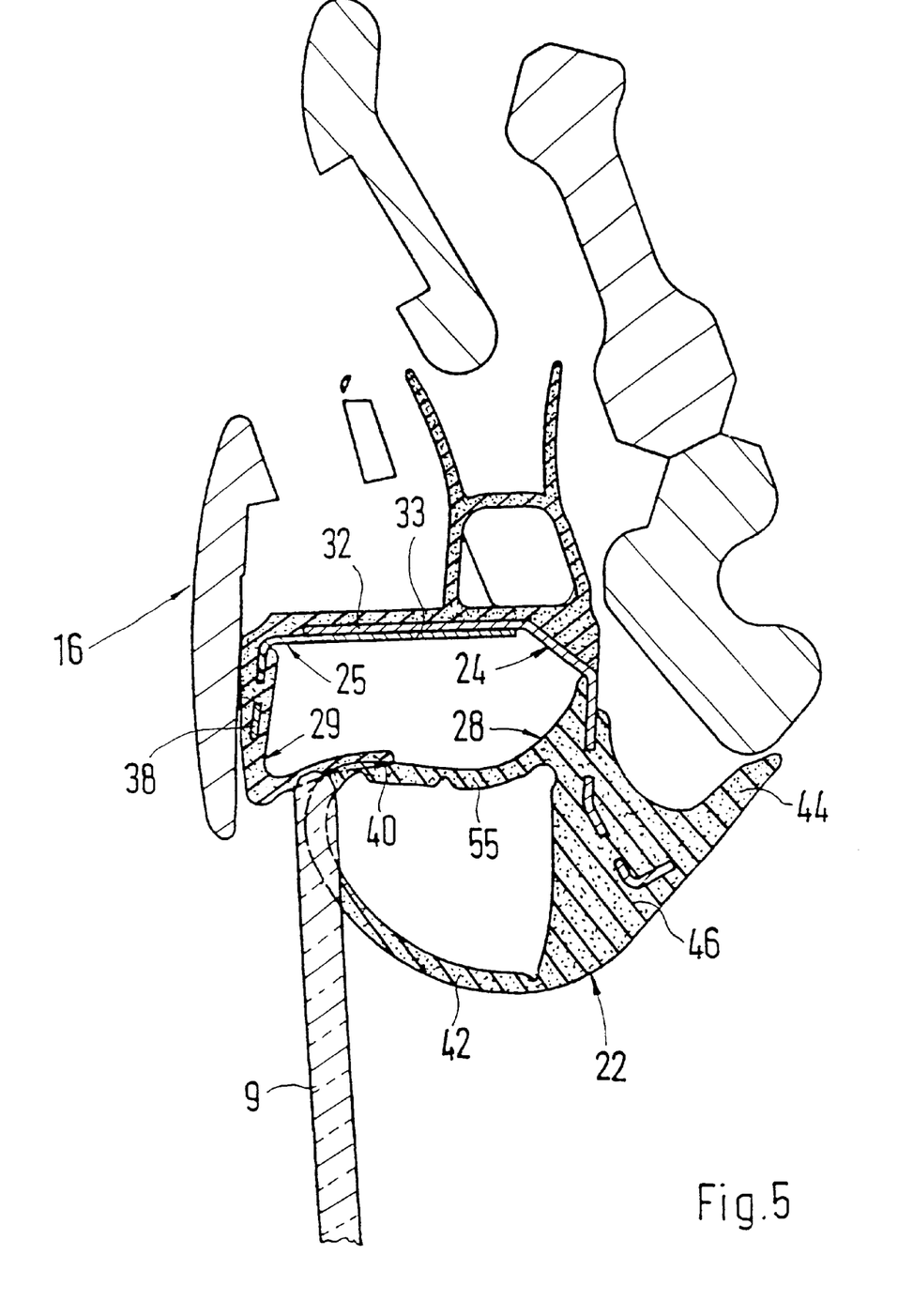
FIG. 5 is a section along line V—V in FIG. 2 in an enlarged view.

In the embodiment, the supporting rails 24, 25 and 26, 27 of sealing bodies 22, 23 are each connected permanently with one another by two spaced rivets 36 (see FIG. 4). Legs 32, 33 and 34, 35 are provided locally with punched holes for this purpose.

Elastomer profile strand 28 is formed on supporting rail 24, elastomer profile strand 29 is formed on supporting rail 25, elastomer profile strand 30 is formed on supporting rail 26, and elastomer profile strand 31 is formed on supporting rail 27. In each case, this is accomplished by areawise sheathing of the supporting rails.

Supporting rails 25, 27, which are located further outward as viewed in the transverse direction of the vehicle, each have the approximate shape of an L, with non-sheathed legs 33, 35 resting on opposite legs 32, 34 of internal supporting rails 24, 26. Openings or elongate holes 37 are provided locally on both non-sheathed legs 32, 33 and 34, 35, through which holes the mounting screws for adjustable attachment of sealing bodies 22, 23 to roof frame sections 16, 17 can be passed and screwed into threaded holes in roof frame sections 16, 17. A thin-walled lip section 40, 41 of the sealing bodies directed toward window 8, 9 is directed away from the free end of each sheathed leg 38, 39, with lip section 40, 41 projecting further inward in the construct-on position than the inside surface A of window 8, 9. Lip section 40, 41 has a reduced cross section on the inside in the connecting area to the sheathed leg 38, 39 (specified bending location).

Internal elastomer profile 28, 30 has a first sealing lip 42, 43 directed toward window 8, 9 and a second, inwardly projecting sealing lip 44, 45 with an expanded cross section 46, 47 being provided between the two sealing lips 42, 43 and 44, 45 on elastomer profile 28, 30 in the vicinity of bent sheathed supporting rails 24, 26.

In the vicinity of sheathed legs 38, 39 and 48, 49, the supporting rails 24, 25 and 26, 27 each have a plurality of circular openings 50, producing an intimate connection of the sheathed elastomer profile strands 28, 29 and 30, 31 with the associated supporting rails 24, 25, and 26, 27.

The areas facing the two windows 8, 9 (lip sections 40, 41 and sealing lips 42, 43 of the elastomer profile strands) abut one another areawise and overlap one another areawise as viewed in the transverse direction of the vehicle when sealing bodies 22, 23 are mounted.

The two sealing bodies 22, 23, over a significant partial area of their lengthwise extent, each have a constant cross-sectional profile. Special molded parts 51, 52, 53 are provided only at the front and/or rear end areas of sealing bodies 22, 23.

In the embodiment, sealing lips 42, 43 of inner elastomer profile strands 28, 30 facing windows 8, 9 are expanded in the vicinity of molded parts 51, 52, 53 by an inner rib 54, 55, 56 to form a closed hollow profile, so that front sealing body 22 is additionally stiffened at both ends and rear sealing body 23 is additionally stiffened at its upper end.

Figure 10:
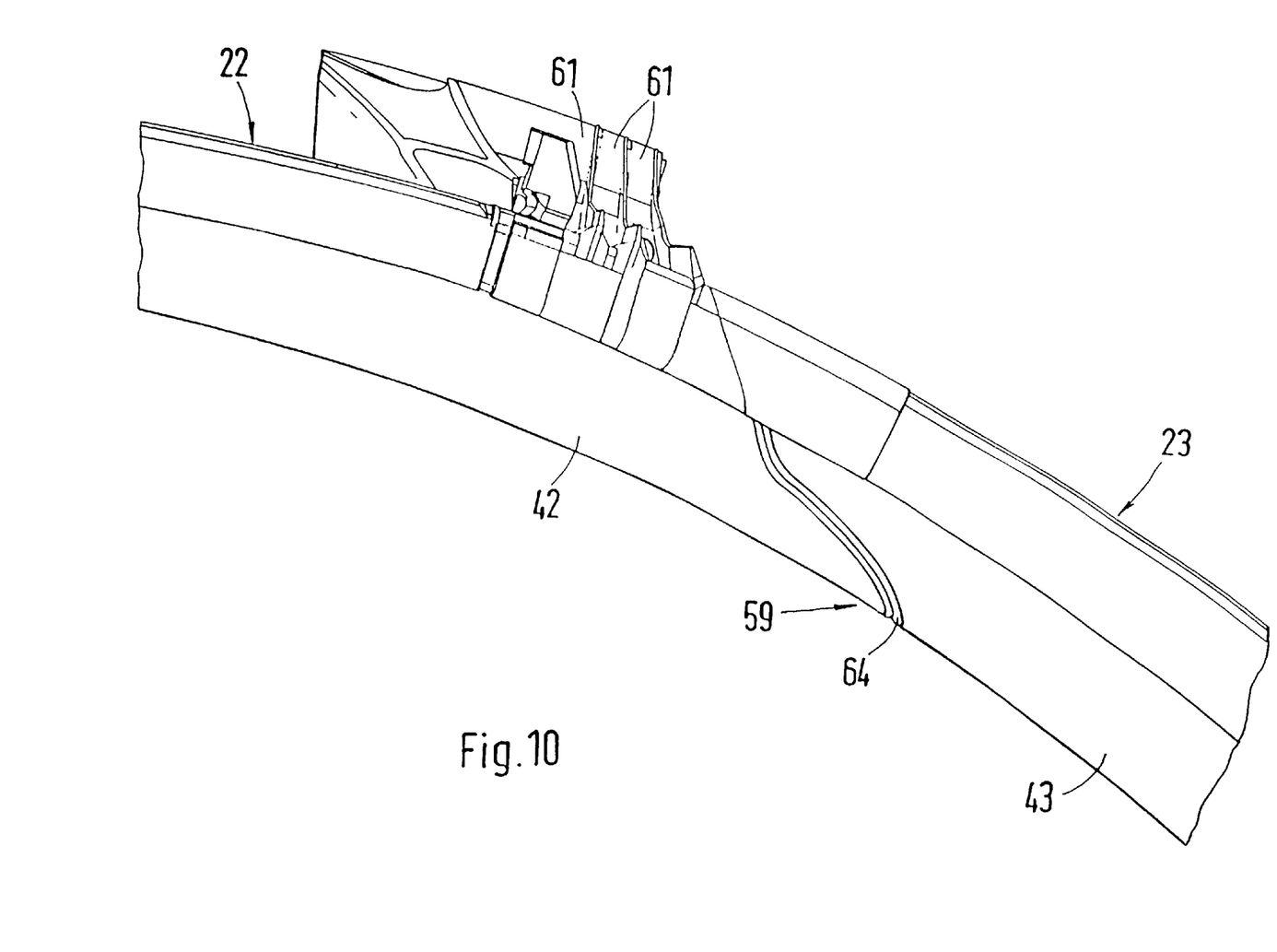
FIG. 10 is a partial side view of the transitional area of the two sealing bodies.
Figure 11:
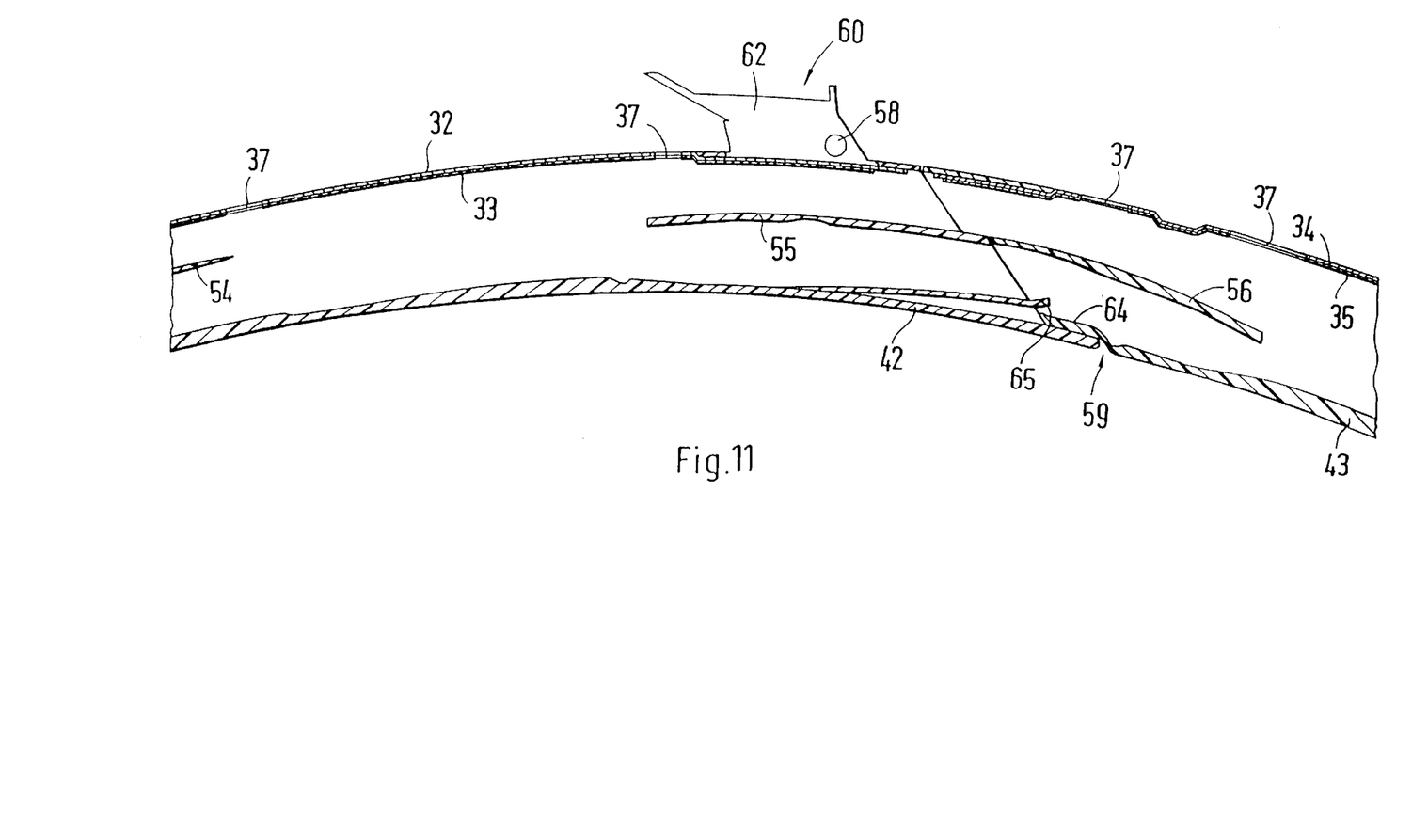
FIG. 11 is a lengthwise vertical section through the transitional area of the two sealing bodies.

Circular mounting openings 57 are provided on at least one sealing body, 23 for example, in the vicinity of non-sheathed legs 34, 35 of supporting rails 34, 35, so that the mounting bolts for securing sealing body 23 to the roof frame section 17 are freely accessible when the sealing body 23 is mounted. A drain opening 58 is provided on at least one sealing body 22 to carry away water which seeps in. The two sealing bodies 22, 23 overlap areawise in a common connecting area 59, as viewed in the lengthwise direction (FIGS. 10 and 11).

Front sealing body 22 has a mounted molded part 60 on its top on which adjoining transverse channels 61 are formed to carry water away to the sides, as well as thin-walled lip sections 62 that run lengthwise. The molded part 60 is in an operating connection with both roof frame sections 16 and 17 above. Molded part 60 is connected integrally with a supporting rail 25 and is glued by a bead to the second supporting rail 24. Punched holes 63 on supporting rails, 24 for example, serve to reinforce them and to adjust sealing bodies 22, 23. The rear end of sealing lip 42 abuts an offset inner section 64 of sealing lip 43. In addition, front sealing body 22 has an internal reinforcing lip 65 adjacent to section 64.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A sealing device for at least one frameless window of a motor vehicle having roof frame sections, said device including at least one sealing body each of said at least one sealing body having a first and second separately formed embedded supporting rails, with elastomer profile strands being provided that are formed by areawise sheathing of the first and second supporting rails and which, when installed, are in operating relationship with an inside and outside of each of the at least one window, wherein a separate one of said first and second supporting rails is associated with a respective one of the elastomer profile strands of each sealing body that cooperates with the outside of each of the at least one window, and further wherein said first and second supporting rails are connected with one another at legs which are directed in a same direction and are located one above the other in an overlapping relationship, and wherein, when the sealing bodies are installed, areas of the elastomer profile strands, that are in an operating relationship with said at least one window, overlap areawise in a transverse direction of the vehicle.

2. Sealing device according to claim 1, wherein the supporting rails of the sealing bodies are connected with one another by at least one of riveting, screwing, gluing, and welding.

3. Sealing device according to claim 1, wherein the supporting rail that is located further outward as viewed in the transverse direction of the vehicle has an approximately L-shape, with non-sheathed legs resting on legs above an internal supporting rail.

4. Sealing device according to claim 1, wherein a displaceable thin-walled lip section is directed away from a free end of the sheathed leg of the external supporting rail.

5. Sealing device according to claim 1, wherein an internal elastomer profile strand comprises a first sealing lip directed toward the window and a second inwardly projecting sealing lip, with a cross-sectional expansion being provided between the two sealing lips on the elastomer profile strand in the vicinity of the sheathed supporting rails.

6. Sealing device according to claim 1, wherein the supporting rails have a plurality of openings in the area of sheathed legs.

7. Sealing device according to claim 1, wherein, in the areas facing the at least one window, lip sections, sealing lips, and shaped parts of the elastomer profile strands rest on one another areawise in the installed state of the sealing device and overlap one another areawise as viewed in the transverse direction of the vehicle.

8. Sealing device according to claim 1, wherein device comprises at least two sealing bodies abutting one another, said bodies being fastened to roof frame sections supported by arms of a top frame, with sealing bodies overlapping areawise in a common connecting area.

9. Sealing device according to claim 8, wherein one of said sealing bodies are located in front of another one of said sealing bodies and has a molded part mounted on its top, in which part adjacent channels running crosswise are formed to carry away water, as well as lip sections extending lengthwise, with the molded part being in an operating relationship with the roof frame sections located above.

10. Sealing device according to claim 1, wherein sealing lips facing the window of an inner elastomer profile strand are expanded at the ends of the sealing bodies by a transverse internal rib to form a closed, hollow profile.

11. Sealing device according to claim 1, wherein a drain opening to carry away seeping water is provided on at least one sealing body.

12. Sealing device according to claim 1, wherein mounting openings are provided in at least one sealing body in the vicinity of non-sheathed legs of the supporting rails.

13. A sealing device for at least one window of a vehicle having a roof frame section, comprising:

a first sealing body comprising elastomer profile strands which, when installed, are in an operating relationship with an inside surface and an outside surface of the window, respectively, a first supporting rail being embedded in one of the elastomer profile strands that cooperates with the outside surface of the window, and another separately formed supporting rail being coupled with the first supporting rail along legs thereof which are directed in a same direction and are arranged one above the other in an overlapping relationship;

wherein areas of the elastomer profile strands which are in an operating relationship with the inside and the outside surface of the window overlap each other in a transverse direction of the vehicle.

14. The sealing device according to claim 13, wherein the supporting rails are connected with one another-along their legs by at least one of riveting, screwing, gluing and welding.

15. The sealing device according to claim 13, wherein the supporting rail located further outward when viewed in a transverse direction of the vehicle, has an approximately L-shape, including a non-sheathed leg, and wherein the supporting rail located further inward also has a leg, the leg of the external supporting rail resting on the leg of the internal supporting rail.

16. The sealing device according to claim 15, wherein the elastomer profile strand includes a displaceable thin-walled lip section which is directed away from a free end of the sheathed-leg of the external supporting rail.

17. The sealing device according to claim 13, wherein one of the elastomer profile strands which is internal to said vehicle comprises a first sealing lip directed toward the window and a second inwardly projecting sealing lip, a cross-sectional expansion being provided between the first and second sealing lips in a vicinity of the supporting rail.

18. The sealing device according to claim 1, wherein the supporting rails have a plurality of openings in areas embedded in the elastomer profile strands.

19. A motor vehicle, comprising:

a vehicle body including roof frame sections;

at least one frameless window arranged in the vehicle body;

a first sealing body fastened to at least one of the roof frame sections, said first sealing body comprising separate supporting rails, each of said separate supporting rails being sheathed with an elastomer profile strand which, when installed, are in an operating relationship with an outside surface and an inside surface of the window, respectively, wherein the separate supporting rails connect with one another along legs directed in a same direction and located one above the other in an overlapping relationship such that areas of the elastomer profile strands, that are in operative relationship with the at least one window, overlap in a transverse direction of the vehicle.

20. The vehicle according to claim 19, further comprising a second sealing body and a second window in cooperation therewith, wherein the first and second sealing bodies abut one another in an overlapping manner in a common connecting area.

21. The sealing device according to claim 20, wherein one of said two sealing bodies is arranged toward the front of the vehicle and has a molded part mounted on its top, in which part adjacent channels running crosswise are formed to carry-off water, as well as lip sections extending lengthwise, the molded part being in an operative relationship with the roof frame sections, located above.

* * * * *